United States Patent [19]

Robinson et al.

[11] 3,787,343

[45] Jan. 22, 1974

[54] TREATMENT OF COAL EXTRACTS

[75] Inventors: Joseph Gordon Robinson, Winchcombe; William Sydney Durham Wise, Tewkesbury, both of England

[73] Assignee: Coal Industry (Patents) Limited, London, England

[22] Filed: Mar. 11, 1971

[21] Appl. No.: 123,423

[30] Foreign Application Priority Data
Mar. 17, 1970  Great Britain ................... 12755/70

[52] U.S. Cl. .................................................. 260/28
[51] Int. Cl. ............................................ C08g 51/52
[58] Field of Search ...................................... 260/28

[56] References Cited
UNITED STATES PATENTS
3,301,803  1/1967  Schick .................................. 260/28

| | | | |
|---|---|---|---|
| 3,207,717 | 9/1965 | Maier | 260/28 |
| 3,061,900 | 11/1962 | Montgomery | 260/28 |
| 3,207,687 | 9/1965 | Maier | 260/28 |
| 3,988,525 | 6/1961 | Clem | 260/28 |

*Primary Examiner*—Morris Liebman
*Assistant Examiner*—P. R. Michl
*Attorney, Agent, or Firm*—Stevens, Davis, Miller & Mosher

[57] ABSTRACT

Phenolic compositions which may be reacted with aldehyde or aldehyde donors, e.g., formaldehyde or hexamine, to form resinous or resinifiable compositions may be manufactured by reacting a solution or extract of coal with a phenol.

8 Claims, No Drawings

TREATMENT OF COAL EXTRACTS

This invention relates to thermosetting resins, and a process for the manufacture thereof.

According to the invention a process for the manufacture of a phenolic composition comprises reacting a solution or extract of coal with a phenol.

The product of such a reaction is a compound of the general formula R—(—$\phi$—OH)$_n$ wherein R is the residue of a solution or extract of coal, $\phi$ is the residue of a phenol of formula $\phi$—OH and includes an aromatic ring and n is an integer. It is to be understood that the residue of the solution or extract of coal may have any number of groups —$\phi$—OH attached thereto. A normal number will be one, two or three and certain of the general formulae in this specification, by way of illustration, show compounds where $n = 2$.

By "solution or extract of coal" it is meant to include those products formed by the treatment of coals with solvents, particularly those solvents that react with the coal, cleaving the molecular chains thereof, to form a product having a mean molecular weight of less than 2,000 and preferably between 500 and 200. High boiling aromatic solvents may be used, but it is preferred that the solvent should contain at least a portion of a compound reacting with and tending to degrade the coal, for example a compound having nitrogen as the heteroatom in a five or six membered heterocycle ring. Other such compounds are included in those aromatic compounds derived from aromatic compounds having at least two aromatic rings by the partial hydrogenation thereof. Additionally, or alternatively, the solution or extract of coal may be formed by the treatment of the coal with the solvent in the presence of hydrogen. This degrades the coal, diminishing the molecular weight thereof. Suitable solvents that may be employed include oils and tars formed by the distillation of pitches and tars, for example creosote oil and other tar oils, and include also tar bases and hydrogenated tar bases. Examples of compounds that may be employed to form the solution or extract of coal suitable for use in the present invention includes the following, although it will be understood that, for economic reasons, pure solvents will not normally be employed: 1,2,3,4-tetrahydroquinoline, indolene, indole, pyridine, piperidine, perhydropyrene, perhydrophenanthrene, pyrrole, 9,10-dihydroanthracene, tetralin, pyrrolidone, pyrazine, pyrene, phenanthrene, 2-pyrrolidone, acenaphthene, anthracene, diphenylene oxide, nicotinic acid, chrysene, fluorene, fluoroanthrene, phthalic acid.

The term "solution or extract of coal" is not intended to be limited to products formed by the liquid phase dissolution or extraction of coal but to include those products formed by treating coal, or a solution or extract thereof, with a solvent in the gaseous phase, at either above or below the critical pressure and temperature of the gaseous solvent, and condensing the portion of the coal dissolved or entrained in the gaseous solvent. Such solvents are not limited to those that are liquid at ambient conditions but may include, for example, methane and other gases. Other solvents that are particularly suitable for treating the coal in the gaseous phase include pyridine, toluene, and mixtures of such solvents.

Any coal may be, in principle, employed to form the solution or extract of coal. It is, however, known that coals having a high carbon content, for example about 90 percent, are difficult to dissolve or extract, unless hydrogen is employed in large quantities. Accordingly it is preferred to employ a coal other than that of National Coal Board Coal Rank Code 100 series. Desirably the coal has a carbon content of between 80 and 90 percent and preferably between 82 and 86 percent. The term "coal" as used herein is intended to include materials that are of coal-like nature and which contain dissolvable material, for example lignite. Percentages of the carbon in the coal are expressed on a dry mineral-matter free basis by weight.

The coal may be dissolved or extracted by a liquid at an elevated temperature, desirably between 300° and 450° C. The prefered temperature is about 400° C. Normal chemical engineering considerations would be applicable to this dissolution or extraction. For example, the higher the temperature, the more rapidly the dissolution or extraction takes place, but the more undesirable by-products, particularly cokes, are formed. The dissolution or extraction can take place in any suitable manner. One method, if the dissolution or the extraction is by a liquid, is by digestion of the coal with the solvent, the solvent being in excess, at an elevated temperature and then removing the solid material that is not dissolved from the solution, if such solid material is not required in the product. An alternative method is by extraction, as, for example, in a Soxalet type of apparatus. Excess, or all, the solvent can then be removed, for example by distillation.

Any phenol may be employed in the present invention. The most convenient phenols are monocyclic monophenols, for example phenol. Other phenols may, however, be employed, for example the cresols, resorcinol, and the xylenols.

According to a modification of the present invention, for at least a portion of the phenol, an aromatic amine may be substituted, for example aniline, but other aromatic amines, including N-alkyl aromatic amines can be employed, for example N-methylaniline and N,N-dimethylaniline.

Preferably the solution or extract of coal is reacted with the phenol in a molecular ratio of coal extract to the phenol of one to at least 1.5. Advantageously, the ratio of the solution or extract of coal to the phenol may be even lower, for example between 1 to 2 and 1 to 3. The greater the amount of the phenol present, the greater the amount of cross-linking in the cross-linked thermoset polymer after reaction with the aldehyde.

The reaction of the phenol with the solution or extract of the coal is advantageously carried out in the presence of a strong acid catalyst, which may be an inorganic protonic acid, for example sulphuric acid, or a Lewis acid, for example aluminium chloride or ferric chloride.

The reaction of the phenol with the solution or extract of coal is preferably performed at an elevated temperature, for example about 50° C. The reaction is preferably carried out in an inert atmosphere.

The phenolic composition may be reacted with an aldehyde, in any manner analogous to those employed for previously known compounds having at least one phenolic hydroxyl group on each of two unfused aromatic rings. Desirably the aldehyde is an aldehyde having not more than four carbon atoms. Preferably the aldehyde is formaldehyde. An aldehyde donor forming the aldehyde under the reaction conditions or otherwise reacting to introduce the equivalent to an aldehyde residue may be employed, for example hexamine or paraldehyde.

The aldehyde may be reacted with the phenolic composition at a relatively low temperature, for example below about 100° C, in alkaline conditions to form a resol. Such a resol formed by the reaction of formaldehyde may be represented as having the general formula:

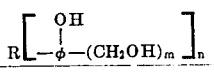

wherein $m$ is an integer which may differ at each of its occurrences in any molecule. Depending on the relative amount of formaldehyde employed, the number of methylol groups present may vary. Such resols may be dissolved in an organic solvent to form a varnish.

If the aldehyde is reacted with the product of the reaction of the phenol with the solution or extract of coal in acidic conditions, a thermoplastic polymer or novolak is formed. This is a substantially linear polymer having, in the case where the aldehyde is formaldehyde, as chain extending groups, and preferably as substantially the only chain extending groups, groups have the general formulae

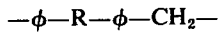

and

If the aldehyde is reacted with the product of the reaction of the phenol with the solution or extract of coal at a relatively higher temperature, for example above about 100° C, in alkaline conditions, or the resol is treated with an acid, or the thermoplastic product or novolak is reacted with an aldehyde in the presence of a base, the product will normally be cross-linked thermosetting polymer. The reaction at the relatively higher temperature may be considered as equivalent to carrying out the reaction of the resol with the acid or the thermoplastic product or novolak with the aldehyde in the presence of the base concurrently with the formation of the resol or the thermoplastic produce or novolak. Such a cross-linked, thermoset polymer, formed by the reaction of formaldehyde, may be represented generally as having the following general formula, indefinitely extended:

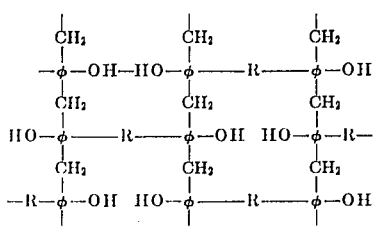

Depending on the relative amount of formaldehyde employed, there may be more or fewer methylene bridges and/or methylol groups and/or oxydimethylene ($—CH_2.O.CH_2—$) bridges. Depending on the amount of phenol employed, there may be more or less cross-linking.

The products may be modified in analogous way to those resins derived from phenols having one phenolic hydroxyl group on each of two non-fused aromatic rings. The resols or the product of the reaction of the phenol with the solution or extract of coal may be mixed with other phenolic compounds, or other compounds which react with system. Lubricants and/or fillers may be added to vary the characteristics of the products.

The products exhibit good thermal stability and good mechanical and electrical properties combined with low moisture absorption.

The invention is illustrated by the following examples in which all parts are parts by weight.

Preparation of a Solution or Extract of coal 1 part of Markham coal, of National Coal Board coal rank code 802, was treated with 3 parts of a mixture of tetrahydronaphthalene and 1-methylnaphthalene in a ratio of 1 to 1 at 400° C for 1 hour at autogenicpressure and was then filtered to give a solution or extract of coal containing 70 percent by weight of the coal, having a mean molecular weight of about 750, and having a softening point of between 160° and 180° C. The solution or extract of coal so prepared was used in the following examples.

Example 1

One part of the solution or extract of coal, two parts of phenol and 0.4 parts of p-toluene sulphonic acid were heated together under nitrogen at 180° C for 24 hours. The product was then cooled and pulverised. The powder produced was washed with boiling water until no more phenols or other acidic compounds were washed out. The product was dried at 60°C under reduced pressure. This product was mixed with 0.2 parts of hexamine and compression moulded at 160° C under a pressure of 7MN/m² to form a hardened, infusable, insoluble resin.

Example 2

One part of the solution or extract of coal, two parts of phenol and 0.4 parts of anhydrous ferric chloride were heated together at 180° C under notrogen for 24 hours with stirring. The product was cooled, pulverised and washed with boiling water until phenols and other acidic compounds could no longer be washed out. The product was then dried at 60° C under reduced pressure.

The resin was blended with 0.2 parts of hexamine and compression moulded at 160° C under a pressure of 7MN/m² to form a hardened infusable, insoluble resin.

Example 3

One part of the solution or extract of coal, two parts of phenol and 0.4 parts of p-toluene sulphonic acid were heated together under nitrogen at 180° C for 24 hours. The cooled and pulverised product was washed with boiling water to remove unreacted phenol and the acid catalyst. The product was dried at 60° C under reduced pressure. The produce was then mixed with 1½ parts of cotton linters, 0.1 parts magnesium oxide 0.5 parts calcium stearate, 5 parts of a phenolic novolak, 0.4 parts phenol and 3 parts of hexamine. This mixture was blended on a two-roll mill and transfer moulded at 160° C under a pressure of 7MN/m² to give an infusible and insoluble artefact of tensile strength 14MN/m².

Such cross-linked thermoset polymers include groups of the general formula:

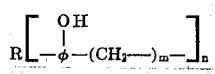

We claim:

1. In a process for the production of a resinous or resinifiable composition by the reaction of a phenolic compound having at least one phenolic hydroxyl group on each of two unfused aromatic rings with an aldehyde having not more than four carbon atoms, or an aldehyde donor forming the aldehyde having not more than four carbon atoms under the reaction conditions or otherwise reacting with the phenolic compound to introduce the equivalent to a residue of the aldehyde, said reaction being carried out under alkaline conditions, the improvement which comprises employing as at least part of the phenolic compound a phenolic composition formed by reaction a solution or extract of coal with a phenol selected from the group consisting of monocyclic monophenols and resorcinol, said phenolic composition consisting of compounds of the general formula

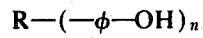

wherein R is the residue of the solution or extract of coal, and $\phi$ is the residue of said phenol, said phenol having a formula $\phi$—OH and $n$ is an integer, said solution or extract of coal including those products formed by the treatment of coal with a solvent, said solvent being, during said treatment, in either a liquid or a gaseous phase, said treatment being carried out in the presence of an inert gas or hydrogen, said treatment being carried out at an elevated temperature whereby molecular chains of the coal are cleaved in said treatment.

2. A process as claimed in claim 1 wherein said solvent includes one or more compounds selected from heterocyclic compounds having a nitrogen atom as the hetero-atom in a 5 or 6 membered ring and heterocyclic or homocyclic compounds having at least one aromatic ring derived from aromatic compounds having at least two aromatic rings by the partial hydrogenation thereof.

3. A process as claimed in claim 2 wherein said phenol is phenol and said residue $\phi$ is a phenylene radical.

4. A process as claimed in claim 3 wherein at least a portion of the aldehyde is formaldehyde.

5. A process as claimed in claim 3 wherein at least a portion of the aldehyde donor is hexamine.

6. A resinous or resinifiable product of claim 1.

7 The resinous or resinifiable product of claim 4.

8. The resinous or resinifiable product of claim 5.

* * * * *